Patented June 19, 1928.

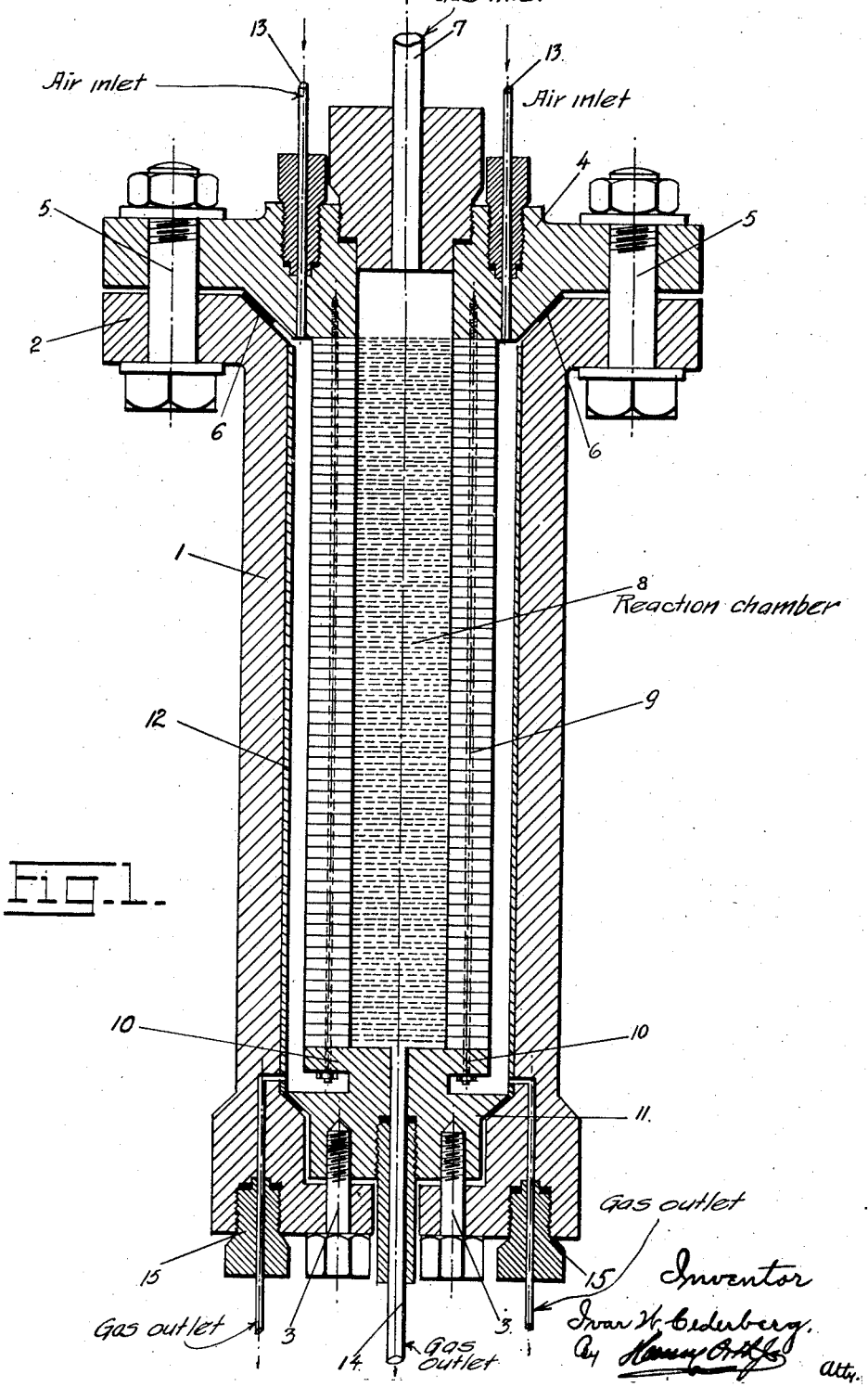

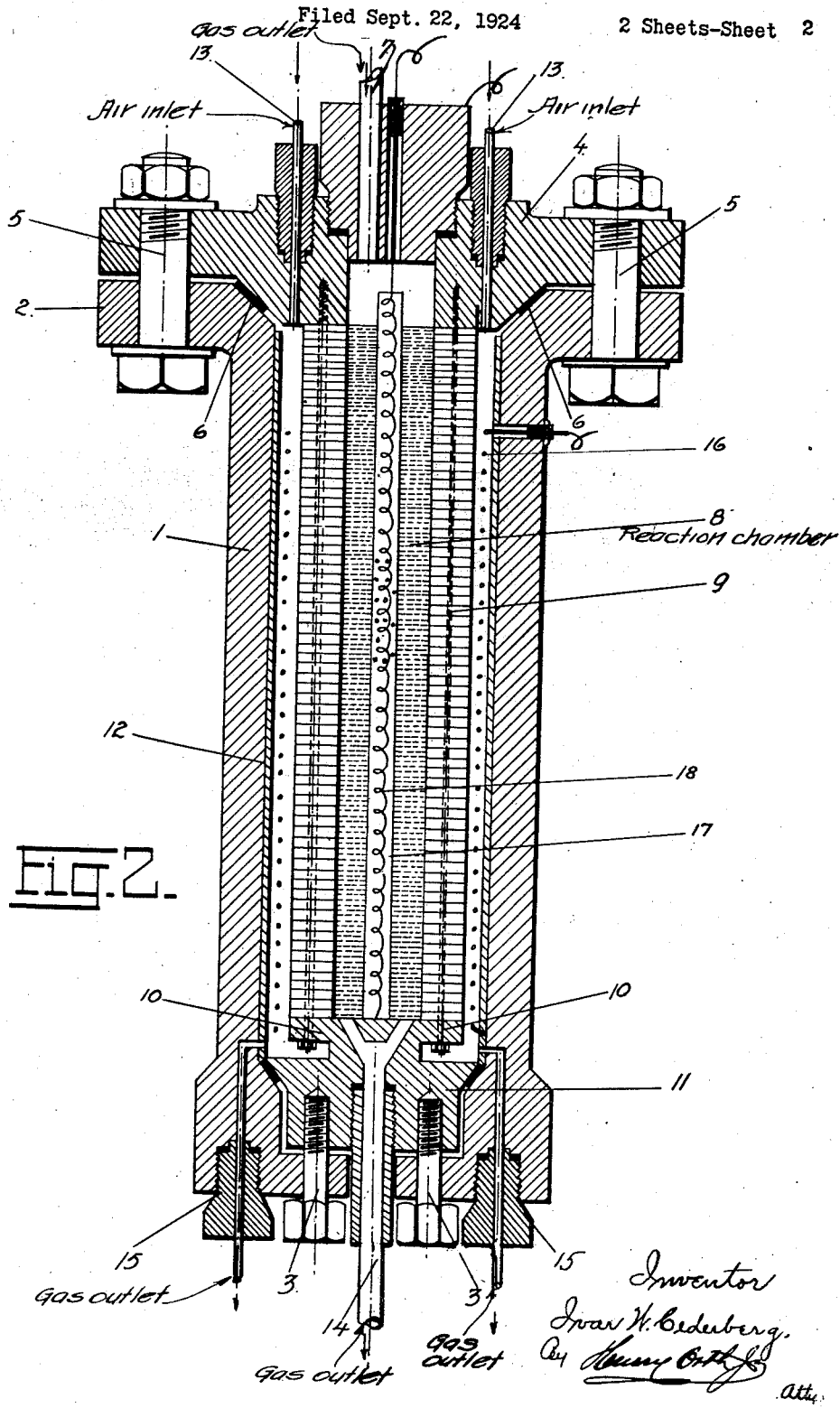

1,673,966

UNITED STATES PATENT OFFICE.

IVAR WALFRID CEDERBERG, OF BERLIN-STEGLITZ, GERMANY, ASSIGNOR TO PATENT VERWERTUNGS AKTIENGESELLSCHAFT "ALPINA," SOCIETE ANONYME POUR L'EXPLOITATION DES BREVETS "ALPINA," PATENTS EXPLOITATION COMPANY "ALPINA" LTD., OF BASEL, SWITZERLAND.

APPARATUS FOR THE SYNTHETIC PRODUCTION OF AMMONIA FROM THE ELEMENTS.

Application filed September 22, 1924, Serial No. 739,213, and in Norway September 28, 1923.

Ever since the first experiments for the direct synthesis of ammonia were performed on a commercial scale, a great many constructions of apparatus have been suggested for the performing of this reaction. The main difficulty in the making of these constructions is that the synthesis of ammonia requires that high temperatures and high pressures be used simultaneously. Under these conditions the reaction chambers are strongly attacked by gases containing hydrogen, which produce changes in the chemical composition of the material and in its physical structure that render very difficult a safe method of operation. Another problem is the placing of devices for the starting and maintaining of the temperature in a way that is most favourable to the course of the reaction in the catalyzer substance through the addition or elimination of heat respectively. Consequently it is quite clear that the known methods require very complicated devices and that the operation of the apparatus is combined with many difficulties.

By the development, however, which has lately taken place in the synthesis of ammonia, it has been possible to perform the reaction under such altered conditions that the above mentioned difficulties in the way of construction have either been done away with or they have, at least, been lessened. The production of especially active catalyzers has made it possible to perform the synthesis at a temperature that is even below 400° and at such a high degree of conversion that the exothermic course of the reaction is not only sufficient to cover the loss of heat in apparatus that is not of too small dimensions, but even precautions must be taken to eliminate the superfluous heat as quickly as possible. Under these conditions there is no longer any special difficulty as far as the resisting capacity of the apparatus is concerned.

The present invention concerns an apparatus which is intended for performing the technical synthesis of ammonia by means of highly active catalyzers at a comparatively low temperature.

The apparatus consists of an outer chamber that withstands pressure, inside of which an inner chamber is placed that is not gas tight and forms the contact chamber that contains the contact substance. The reaction gases, nitrogen and hydrogen and the resulting ammonia can pass through the walls of the contact chamber in any direction.

Examples of how the apparatus is made are shown on Figs. 1 and 2 of the attached drawing.

In the example illustrated in Fig. 1 the apparatus consists of the following main parts:

1. An outer casing or chamber 1, which withstands pressure, made of special steel, which may, when desired, be provided with an inner lining 12, that isolates against heat. The chamber is open at the top and is provided with a strong flange while the bottom of the chamber is closed with the exception of a central opening and holes for the screw-bolts 3, and for the end of the pipes 15 for discharging gas.

2. A lid, 4, which by means of bolts, 5, is fastened to chamber 1 and through which pipes for the supplying of gas, 7 and 13, are conducted.

3. The actual reaction chamber, 8, is formed by a series of rings 9 piled on top of each other. The material of which these rings are made may be either metals that conduct heat or materials that isolate heat, for instance asbestos, all in accordance with the amount of heat that is developed in the contact chamber, which again is dependent on the chemical nature of the catalyzer and the pressure of the reaction gases. The rings are kept in place by the bolts 10 that go through them, which in their turn are fastened to the lid, 4, and to a piece of steel, 11. The latter is, as shown in the drawing, connected gas tight with the reaction chamber. In the middle of it there is an opening for the pipe 14 that discharges the gas.

All the pipes that supply and discharge the gas are provided with regulating valves that are not shown in the drawing.

The above mentioned apparatus can for instance be started and operated in the following manner:

The gases which are preheated in the usual manner are introduced into the apparatus through pipe 7. Of the pipes 14, 15 for discharging the gas, only those at the side are open, while at the beginning of the operation pipe 14 is closed. When pipe 7 is opened to admit gas into reaction chamber 8 there will be a slight overpressure in this chamber sufficient to cause the gases to flow only through the space between the rings 9, which by the use of special means are placed in such a position towards each other that the gas comes out everywhere as evenly as possible.

The mixture of nitrogen and hydrogen is thus brought into the space between the outer reaction chamber and the contact chamber and is here mixed with air supplied through pipes 13. The gas mixture is ignited by electricity by a suitable spark plug, not shown and the burning gases are let out through discharge pipes 15.

As soon as the reaction substance has gained sufficient temperature for reaction and the gases coming through pipe 7 from the heat generator have been heated to such a degree that the formation of ammonia can begin, the pipes 13 for supplying air are closed and the apparatus is subjected to pressure. Now it is obvious that the amount of heat that is developed in the contact chamber, 8, by means of reaction, is dependent on the manner in which the gases are conducted through the contact substance. The amount of heat will be smaller the greater the amount of reaction gas that escapes through the walls of the contact chamber, which thereby can take with it its content of heat. Consequently, after the reaction has commenced, pipe 14 is opened little by little and the temperature controlled by bringing the quantities of gas that emerge from discharge pipes 14 and 15 into as favourable relative opening as possible.

The apparatus may also be started by placing an electric heating apparatus, for instance a heating spiral, 16, in the outer chamber. The heat will then be conducted into the catalyzer substance and as soon as the apparatus commences to produce ammonia the extra heating can be discontinued on account of the amount of heat that is developed.

Another way of working the apparatus, illustrated in Fig. 2, is by not altogether filling the catalyzer chamber with catalyzer substance but by placing in the centre a pipe 17, which may be perforated or built up in the same manner as the other wall, that is, either of rings or of porous material. The electric heating device, 18, is then placed in the centre chamber. The gases can, if desired, be introduced into the apparatus through the heating chambers. The gases will then mainly flow through the catalyzer substance radially and not axially, and radially as in the first case. By means of these apparatus that are suitably constructed any combination of the direction in which the gas flows can be obtained and this is a great advantage as it consequently enables one to regulate the temperature in the catalyzer.

I however, prefer the following method of operating: Through the pipe 7 is introduced a mixture of nitrogen and hydrogen, heated by means of the inner spiral. Discharge pipe 14 is kept closed and the gas passes through the contact substance and the wall 9 into the space between the two pipes and out through the pipes 15. As the temperature rises the current in the heating spiral is reduced, and when the evolution of heat by the reaction covers the heat losses the electrical current is entirely interrupted.

If the synthesis of ammonia is performed under very high pressure, the development of heat in the substance will be very great on account of the high combining factor. It will therefore be necessary to cool the catalyzer in order to avoid superheating. This cooling can, for instance, be performed by using the heat capacity of the gases themselves for eliminating the superfluous heat, by allowing fresh gas to flow in through supplying pipe 13 which then presses in between the rings by reason of its higher pressure and mixes in the contact chamber with the reaction gases. The cooling may also be performed for instance by the circulation of gases in the ring shaped space between the outer chamber and the contact chamber, whereby the transference of heat becomes especially effective, because the ring system works similarly to a radiator.

Claims:

1. In apparatus for the synthesis of ammonia, a casing, a reaction chamber within the casing and spaced from the side walls thereof, said chamber having permeable walls throughout its entire length and means to controllably heat the chamber.

2. In apparatus for the synthesis of ammonia, an outer casing, a reaction chamber permeable throughout its length disposed centrally of said casing and spaced therefrom, and heating means between the permeable reaction chamber and said casing.

3. In apparatus for the synthesis of ammonia, a casing, a centrally arranged permeable reaction chamber spaced therefrom, a perforated tube centrally arranged within the reaction chamber, heating means within the tube and heating means in the space between the casing and reaction chamber.

4. In apparatus for the synthesis of ammonia, a casing, a reaction chamber centrally disposed therein and spaced therefrom and comprising superposed rings between which gases are free to pass, means to admit gases to one end of the space between the casing and chamber, and means to discharge gases at the other end of said space, means to admit gases to one end of the reaction chamber and means to discharge gases from the other end thereof.

5. In apparatus for the synthesis of ammonia, a tubular casing, a permeable reaction chamber centrally disposed therein and spaced therefrom, a perforated tube centrally arranged in the reaction chamber and spaced therefrom, heating means in said tube, heating means in the space between the casing and chamber, means to admit gases through the casing to one end of said space and means to discharge gases through the casing at the opposite end of said space, means to admit gases at one end of the chamber and means to discharge gases from the opposite end thereof.

In testimony that I claim the foregoing as my invention, I have signed my name.

IVAR WALFRID CEDERBERG.